Feb. 27, 1934.  H. J. NATHAN  1,949,064
POWER PLANT MOUNTING
Filed April 19, 1933  3 Sheets-Sheet 1

Inventor
Herbert J. Nathan
By his Attorneys
Williamson & Williamson

Feb. 27, 1934.  H. J. NATHAN  1,949,064
POWER PLANT MOUNTING
Filed April 19, 1933  3 Sheets-Sheet 2
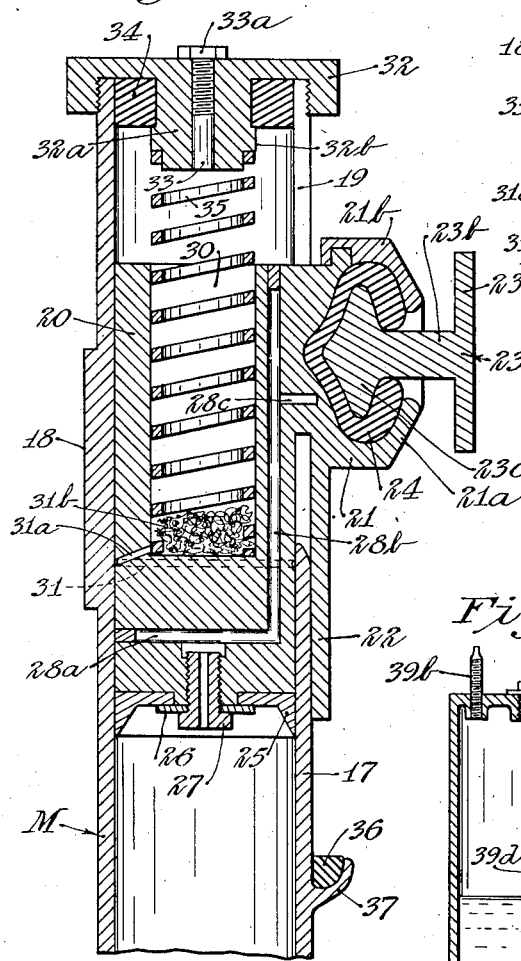
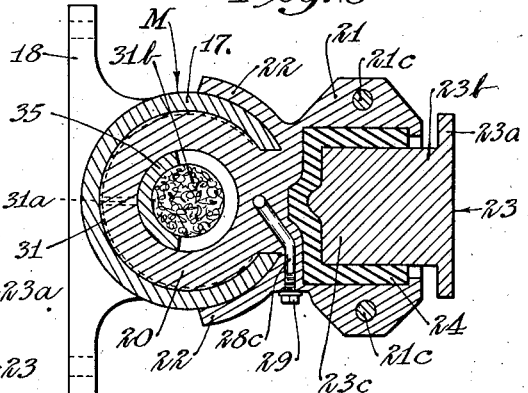
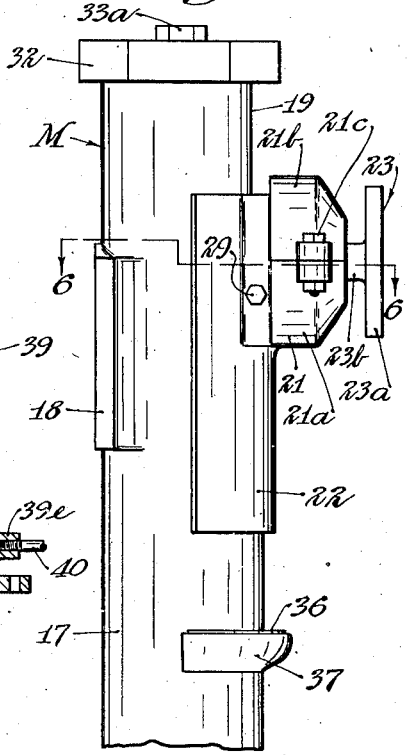
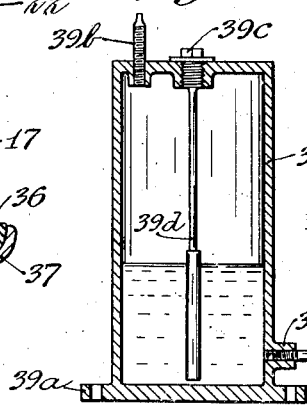
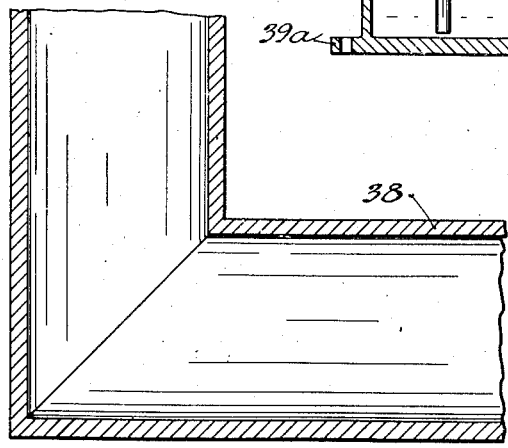
Inventor
Herbert J. Nathan
By his Attorneys
Williamson & Williamson Feb. 27, 1934.  H. J. NATHAN  1,949,064
POWER PLANT MOUNTING
Filed April 19, 1933  3 Sheets-Sheet 3
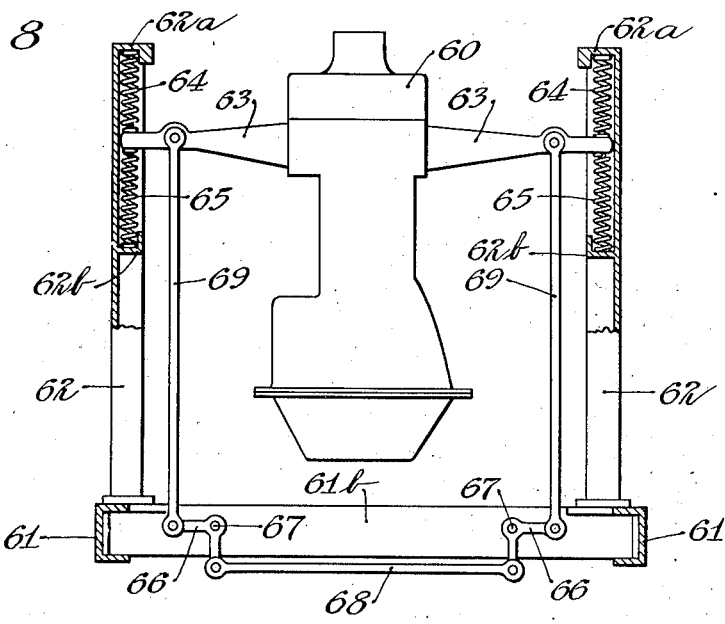
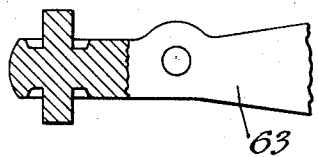
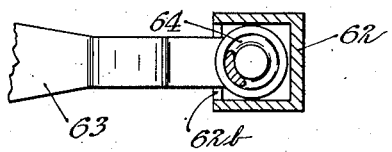
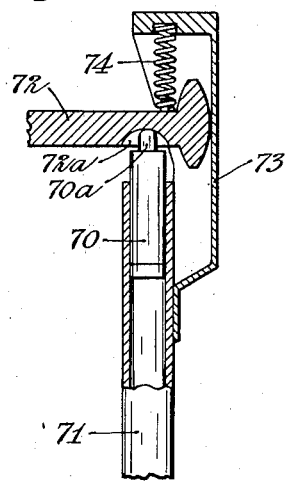
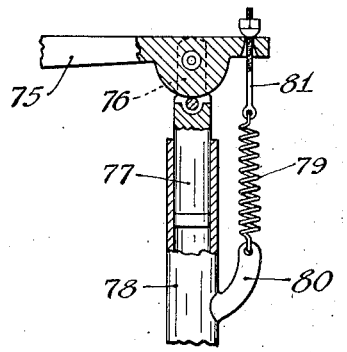
Inventor
Herbert J. Nathan
By his Attorneys
Williamson & Williamson Patented Feb. 27, 1934

1,949,064

UNITED STATES PATENT OFFICE 1,949,064

POWER PLANT MOUNTING

Herbert J. Nathan, Bismarck, N. Dak.

Application April 19, 1933. Serial No. 666,858

12 Claims. (Cl. 248—14.2)

My invention relates to power plant mountings, and particularly to mountings designed to absorb vibration brought about by the pulsating torque developed by internal combustion and steam engines.

None of the vibration absorbing mountings now in use are completely satisfactory. The expedient of adding blocks of resilient material to mountings of long established types has been used but has been unsatisfactory in that oscillation or swinging of the engine brings about a net transverse displacement of engine weight with attendant undesirable results. In order to eliminate transverse displacement of engine weight, engines have been swingably mounted on supports located, respectively, at the power take-off (at the lower rear portion of the engine) and at the upper forward portion of the engine. This mounting has the disadvantage that removal or repair of parts at the front or rear of the engine can only be effected when temporary supports have been provided for the engine and after the said support at the end, being worked on, has been removed. Mounting supports of this type are also disadvantageous in that they restrict available locations for mounting various parts and accessories at the front and rear of the motor.

The principal object of my invention is to provide an engine mounting of novel construction by means of which vibration of an engine, due to the pulsating torque developed thereby, will be absorbed, and hence, prevented from reaching the frame on which the engine is supported.

A more specific object of my invention is to provide motor mountings which will permit oscillation of a motor about an axis passing through both its center of gravity and its power take-off shaft and which are adapted to be located at the sides of the motor as contrasted with mountings located at the front and rear ends of the motor.

Another object is to provide yieldable mountings at the respective sides of an engine and means so connecting the mountings that, as one side of the engine moves upwardly or downwardly, the other side will move a like distance in the opposite direction.

Still another object is to provide such a motor mounting including yieldable means for urging the engine toward its normal position.

A further object is to provide a hydraulically actuated engine mounting, whereby an engine may be supported by a liquid and is permitted to oscillate about an axis passing through its center of gravity.

Fig. 4 is a vertical view of one of the mounting units of my engine mounting;

Fig. 5 is a vertical sectional view of a mounting unit;

Fig. 6 is a horizontal sectional view taken along the line 6—6 of Fig. 4;

Fig. 7 is a vertical sectional view of the pressure tank used in my engine mounting;

Fig. 8 is a partially broken away front view of another embodiment of my invention;

Fig. 9 is a partially sectional vertical view of one of the engine supporting arms shown in Fig. 8;

Fig. 10 is a partially sectional horizontal view of one of the engine supporting arms;

Fig. 11 is a partially sectional vertical view of a portion of yet another embodiment of my invention; and Fig. 12 is a partially sectional vertical view of a portion of still another embodiment of my invention.

Figure 1:
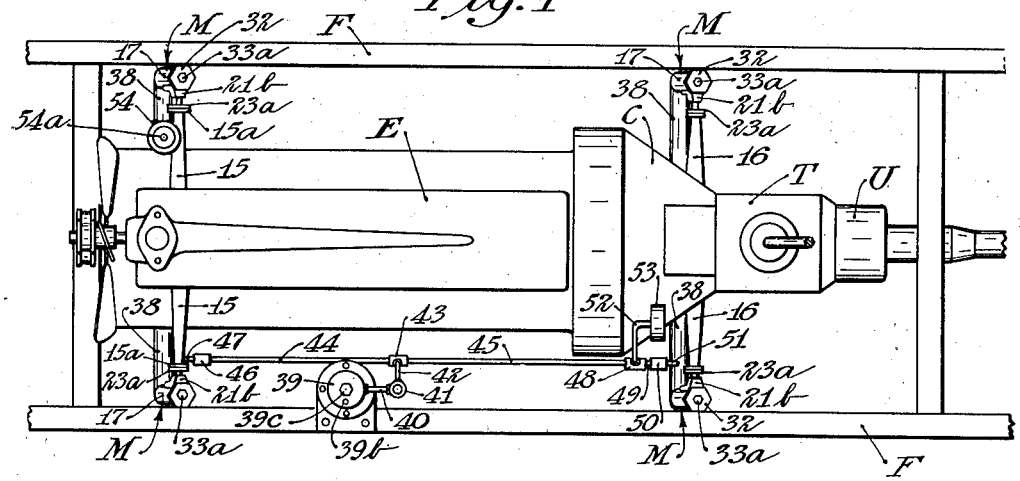
Fig. 1 is a top view of a portion of an automobile frame and an automobile engine associated therewith and mounted thereon by means of one form of my engine mounting.

Referring to the drawings, an automobile unit power plant is shown associated with the forward portion of an automobile chassis frame F, and comprising in general an engine E, a clutch housing C, a transmission case T, and a housing U containing a universal joint.

Support brackets 15 are rigidly attached to and extend outwardly from opposite sides of the forward portion of the engine E and supporting brackets 16 are rigidly attached to and extend outwardly from opposite sides of the rearward portion of the power plant. All four of the supporting brackets 15 and 16 are located in a plane which passes substantially through the center of gravity of the power plant and through the universal joint or point of power take-off. The center of gravity referred to is that of the power plant when the water jacket of the engine is filled with water and the lubricating system of the engine is also filled. The outer ends of the support brackets 15 and 16 are, respectively, connected to mounting units M, which are rigidly mounted on the side members of the chassis frame F and which will presently be described. No supporting means for connecting the power plant to the frame F, other than the supporting brackets 110

15 and 16 and the mounting units M are provided, and rigid connections of any kind between the power plant and the frame are omitted.

Each mounting unit M includes a cylinder 17 having integral therewith a mounting base 18 adapted to be bolted or otherwise rigidly secured to the side members of the frame F. The wall of the cylinder 17, at the side thereof facing the power plant, is provided in its upper portion with a vertically disposed slot at 19. The cylinders 17 are all mounted with their respective longitudinal axes disposed perpendicularly with respect to the plane previously defined.

A piston 20 is disposed within the cylinder 17 and has an integrally formed projection 21 extending radially and toward the engine E through the slot 19. A flange 22, shaped to conform with the contour of the exterior of the cylinder 17 is formed integrally with the projection 21 and extends downwardly therefrom along the inner side of the exterior of the cylinder 17 as shown in Figs. 4, 5 and 6.

The projection 21 has a socket comprising a lower portion 21a formed integrally with the projection 21 and a removable upper portion or cap 21b, as shown in Figs. 4, 5 and 6. A member 23, comprising an attachment flange 23a, a shank 23b and an enlarged head 23c, is attached by means of the flange 23a to a similar flange 15a formed integrally with and located at the outer end of one of the engine supporting brackets 15. The head 23c of the member 23 is encased in compressible elastic material 24 and the compressible elastic material 24 is gripped in the socket formed by the member 21a and the cap 21b. The removable member or cap 21b is secured to the member 21a by means of bolts 21c passing through lugs formed on the respective ones of the members 21a and 21b. The socket formed by the members 21a and 21b, the resilient material 24, and the member 23, co-operate to form a resilient hinge.

The piston 20 has a packing washer or cup 25 secured to its lower end by means of a washer 26 and an axially apertured cap screw 27 engaged with an axially disposed screw-threaded aperture, as shown in Fig. 5. From the upper end of this aperture, a passage comprising the apertures 28a, 28b and 28c, all formed in piston 20, lead to an air relief port closed by a screw 29.

The upper portion of the piston 20 is hollow as at 30. Just below the bottom of the hollow portion 30 of the piston, the exterior of the piston is provided with an annular lubricant conveying groove 31 communicating with the lower end of the hollow portion 30 by means of a duct 31a. A mass 31b of absorbent material is centrally located in the lower end of the hollow portion 30.

The upper end of the cylinder 17 is provided with a cap 32, screw-threadedly engaged therewith. The cap 32 has a depending concentrically located generally cylindrical portion 32a having a flange 32b. An axially located passage 33, in which a plug 33a is screw-threadedly engaged, extends through the cap 32 and the depending portion 32a. An annular shock absorbing member 34, formed of compressible material, is disposed in the annular space between the depending portion 32a of the cap and the internal periphery of the cylinder 17.

A helical compression spring 35 extends between the lower side of the flange 32b and the lower end of the hollow upper portion 30 of the piston 20.

An arcuate bumper 36, formed of compressible material, is retained in an arcuate retaining member 37 formed integrally with the cylinder 17 and having an upwardly opening trough-like portion disposed below the flange 22 associated with the piston 20.

The respective lower ends of cylinders 17 of pairs thereof, transversely aligned with respect to the frame F, are connected by cross conduits 38 having an internal cross-sectional area substantially equal to that of said cylinders. The conduits 38 and the portions of the cylinders 17 below the pistons 20 are filled with suitable liquid, such as oil or glycerine.

Figure 2:
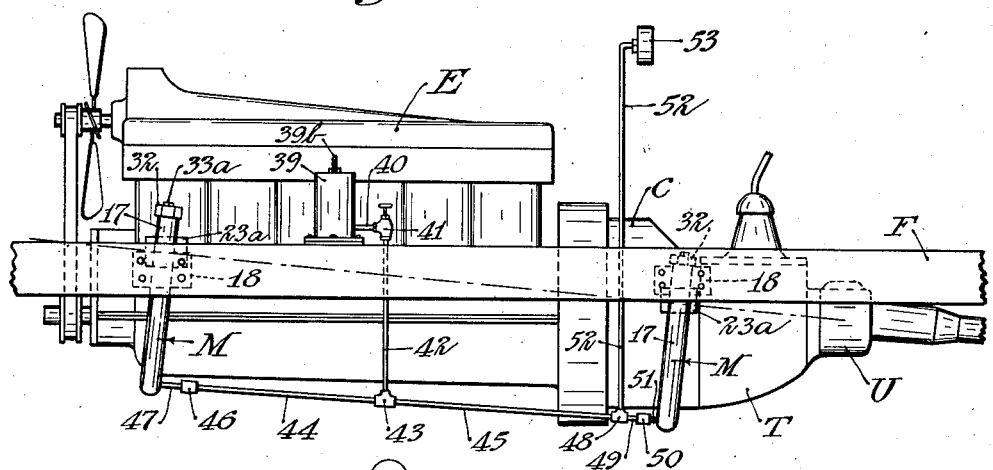
Fig. 2 is a side view.
Figure 3:
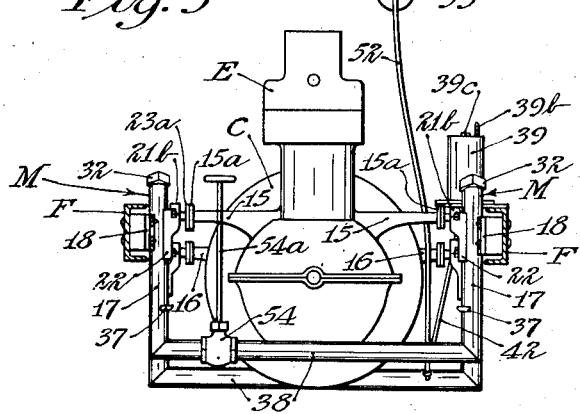
Fig. 3 is a front view.

A pressure chamber 39 has a mounting flange 39a at its lower end, by means of which it is secured to the frame F. In the upper portion of the chamber 39, is an inlet fitting 39b containing a check valve for use in introducing air under pressure to the interior of the chamber, the check valve being arranged to prevent exit of air therethrough. A filler plug 39c is screw-threadedly engaged in an aperture in the top of the chamber 39b. Depending from the plug 39c, is a gauge rod 39d for determining the depth of liquid in the chamber. An outlet 39e is provided in the lower portion of the chamber. A conduit 40 runs from the outlet 39e to a valve 41 (see Figs. 1 and 2), to the other side of which is connected one end of a tube 42. The remaining end of the tube 42 is connected through a T coupling 43 to tubes 44 and 45. Tube 44 is connected to one of the cross conduits 38 through a check valve 46 and a tube 47, and tube 45 is connected to the remaining one of the cross conduits 38 through a T coupling 48, a tube 49, a check valve 50 and a tube 51. From the T coupling 48, a tube 52 extends to a pressure gauge 53. The check valves 46 and 50 are arranged to permit entrance of liquid to the conduits 38 and prevent exit therethrough from the conduits.

The above described system of tubes is filled with liquid up to a point within the pressure chamber 39.

A hydraulic locking valve 54, having an elongated upwardly extending operating shaft 54a, is connected in the forward one of the cross conduits 38.

In normal operation, the portions of cylinders 17 below the pistons 20, the cross conduits 38, the system of tubing connecting the pressure chamber 39 to the cross conduits 38, and the lower portion of the pressure chamber 39 are filled with liquid. The pistons 20 and the power plant supported thereby through the support brackets 15 and 16 are supported by the liquid in the system. The springs 35 act to urge the power plant toward its normal position. Air pressure may be produced in the upper portion of the compression chamber 39 by introducing air under pressure, as from a source of compressed air or from a hand tire pump, through the entrance fitting 39b. The air pressure, of course, exerts a pressure on the liquid in the compression chamber 39. This pressure is retained by the valve 41 normally closed and is normally greater than the pressure in the remainder of the system. To increase the pressure in the cylinders, the valve 41 is opened momentarily. The pressure in the cylinders 17 may be determined by means of the pressure gauge 53. The check valves 46 and 49 permit flow of liquid into the cross conduits 38 and the cylinders 17, prevent exit of liquid therefrom, and prevent transfer of liquid between the front and rear cross conduits and cylinders. Any air accumulating in the cylinders may be released through the ducts 28a, 28b and 28c, by loosening the plug 29. To provide access for putting lubricants in the upper portions of the cylinders 17, the plugs 33a may be removed. Lubricant will be carried to the outer periphery of the piston through the duct 31a and the groove 31, and a portion of the lubricant will be retained in the mass 31b of absorbent material. Access for placing liquid in the compression chamber 39 may be had by removing the plug 39c and the height of the liquid in the compression chamber may be determined by means of the gauge rod 39d.

Operation

Torque reaction will tend to rotate the power plant in a direction opposite to the direction of rotation of its crankshaft, and hence, will urge the pistons 20 at one side of the engine downwardly. Downward movement of the pistons 20, at one side of the power plant, will force liquid from the respective cylinders 17 in which these pistons operate through the respective cross conduits 38 into corresponding cylinders 17, at the other side of the power plant, to force the pistons 20 in the last mentioned cylinders upwardly. Since all of the pistons are of the same size, one side of the power plant will be lifted and the other side will be lowered through equal distances which, of course, results in partial rotation of the power plant. Since the support arms 15 and 16 are all disposed in a plane passing through the center of gravity of the power plant and the center of the universal joint and all of them extend equal distances outwardly from the power plant, it follows that the partial rotation of the power plant is about an axis passing through the center of gravity of the power plant and the center of the universal joint. If the partial rotation of the power plant takes place about an axis passing through the center of gravity of the power plant, it is obvious that such rotation will result in no net displacement of weight in any direction. The springs 35 tend to urge the power plant toward its normal position but, on the occurrence of torque reaction, will yield to permit oscillation of the power plant about the previously described axis, and hence, will minimize the degree to which torque reaction is transmitted from the power plant to the frame F.

If oscillation of the engine should take place to an extreme degree, the upper ends of the piston 20 would engage the compressible material 34 in the upper ends of the cylinder 17 at one limit of oscillation and the lower end of the flange 22 would engage the compressible bumper 36 at the other limit, whereby the shock would be absorbed by the compressible material 34 and 36. Also, if escape of the liquid causes the engine to be lowered, the lower ends of the flanges 22 will rest upon the respective ones of the bumpers 36, whereby the engine will be supported by these bumpers.

If it is desired to restrain the engine against oscillation, for purposes of cranking the same by hand or making repairs or adjustments on the same, the hydraulic locking valve 54 may be closed to prevent transfer of liquid between the respective cylinders 17 associated with the cross conduit 38, in which the valve 54 is located, and hence, to prevent movement of the pistons associated with these cylinders.

When the engine is in positions other than normal, the brackets 15 and 16 will be disposed at an angle to their normal positions, and hence, will not be disposed normally with respect to the longitudinal axes of the pistons 20 and cylinders 17, and also the horizontal distance between the ends of the brackets will be slightly less than normal. The resilient hinges formed by the members 21a and 21b, the resilient material 24, and the headed members 23 are designed to yield for the purpose of absorbing the above described distortions.

It is to be understood that if, for any reason, it is desirable for the engine support brackets 15 and 16, at opposite sides of the engine, to be of unequal lengths, compensation may be made by constructing the cylinders 17 and pistons 20 of the engine mountings associated with the respective ones of said unequal brackets to have cross-sectional areas inversely proportional to the lengths of the respective brackets.

It is apparent that my mountings may be used to support an engine alone, an engine and clutch, or a unit power plant, including an engine, a clutch, and a transmission. It is also apparent that my mounting may be used in connection with aircraft engines, marine engines, stationary engines, and tractor engines, as well as automobile engines, and that it need not be limited to use with internal combustion engines.

In Figs. 8, 9 and 10 of the drawings, another embodiment of my invention is shown. In this embodiment, an engine 60 is associated with a frame 61. Secured to the frame 61 and disposed in a manner similar to that of the mounting units M of the previously described form of the invention, are four columns 62. The columns 62 are of channel-shaped cross-section with the open side thereof facing inwardly toward the engine 60. The upper end of each of the columns 62 is closed by a transverse member 62a and the medial portion is traversed by a transverse member 62b. At each side of the engine is a pair of outwardly extending supporting brackets 63 arranged in the same manner as the supporting brackets 15 and 16 of the first described form of the invention. The outer end of each of the brackets 63 is disposed between the flanges of one of the respective channel-shaped columns 62 in a location between the transverse members 62a and 62b. A helical compression spring 64 is located between the upper side of the outer end of the bracket 63 and the transverse member 62a and a second helical compression spring 65 is located between the lower side of the outer end of the bracket 63 and the transverse member 62b.

The frame 61 is provided with cross members 61b upon which bell-cranks 66 are pivotally mounted at 67, as shown in Fig. 8. The respective ends of a link 68 are pivotally connected to the ends of the arms of the respective bell-cranks 66. A link 69 is pivotally connected at its respective ends to the end of the outwardly extending arm of each bell-crank and the outer portion of the supporting bracket 63 thereabove.

In this form of the invention, it is apparent that one of the supporting brackets cannot be lowered without the bracket at the other side of the engine therefrom being raised to a similar degree and that oscillation of the engine will take place in the same manner as with the first described engine mounting.

Fig. 11 shows a portion of another embodiment of my invention in which pistons 70 work in open topped cylinders 71, which are disposed and interconnected in the same manner as the cylinders of the first described form of the invention. Engine support brackets 72, disposed in the same manner as the engine support brackets of the first described form of engine mounting, have recesses 72a in the lower sides of the outer ends thereof, which engage projections 70a on the upper ends of the pistons 70. The outer end of each support bracket is enclosed and guided by a casing 73 which is secured to the cylinder 71. A helical compression spring 74 is disposed between the upper side of the outer end portion of the bracket 72 and the closed upper end of the casing 73. Obviously, the operation of this engine mounting is the same as that of the first described embodiment of the invention.

Fig. 12 shows a form of the invention somewhat similar to that of Fig. 11, wherein an engine support bracket 75 is pivotally connected to a link 76 which, in turn, is pivotally connected to the upper end of a piston 77 working in a cylinder 78. A helical tension spring 79 is connected at its lower end to an arm 80, which is secured to the cylinder 78, and is connected at its upper end to the outer end of the support bracket 75 through an eye bolt 81, as shown. The action will obviously be the same as that of the form shown in Fig. 11.

It is apparent that I have invented a novel, efficient, inexpensive, and effective form of vibration absorbing engine mounting, wherein the mounting units are disposed at the sides of the engine instead of at the front and rear, whereby the engine is allowed to oscillate about an axis intersecting its center of gravity and the center of its power take-off element, and wherein the engine is supported by a liquid.

It will be understood that the power plant unit referred to in the appended claims may include, in addition to an engine, any or all of such associated devices and accessories as the clutch, transmission, radiator, electrical system, and fuel supply system and that in such instances the entire power plant unit, including such devices and accessories, is mounted to oscillate as a unit.

What is claimed is:—

1. In combination with a power plant unit having a power take-off element extending from at least one end thereof, a supporting frame for said unit, supporting elements connected with said unit and extending outwardly from each side thereof, said supporting elements being all disposed substantially in a plane extending horizontally through said power element at one end of said unit and also extending through the center of gravity of said unit, a series of mountings secured to said frame, one adjacent each corner of said unit, said mountings including reciprocable supporting members longitudinally movable in lines extending substantially perpendicular to said plane, and equalizing means connected with corresponding supporting members at opposite sides of said unit and operative to cause said corresponding members to move in opposite direction and in unison, whereby said unit may oscillate relatively to said frame.

2. In combination with a power plant unit and a supporting frame therefor, hydraulic means for supporting said unit from said frame, said means being so constructed and arranged as to provide for bodily oscillation of said unit and to limit said oscillation to rotary oscillation about an axis disposed in general longitudinally with respect to said unit and passing through the center of gravity of said unit.

3. In combination with a power plant unit and a supporting frame therefor, hydraulic means connecting said frame to the respective sides of said unit for supporting said unit, said means being so constructed and arranged as to provide for bodily oscillation of said unit and to limit said oscillation to rotary oscillation about an axis which passes through the center of gravity and the power take-off element of said unit.

4. In combination with a power plant unit and a supporting frame therefor, hydraulic means for supporting said unit from said frame, said means being so constructed and arranged as to provide for bodily oscillation of said unit and to limit said oscillation to rotary oscillation about an axis disposed in general longitudinally with respect to said unit, and yielding means for urging said unit toward its normal position.

5. In combination with a power plant unit and a supporting frame, a substantially vertically disposed cylinder adjacent each corner of said engine and mounted on said frame, a conduit providing communication between the lower end of each cylinder and the lower end of the cylinder directly opposite and at the other side of said unit, a piston disposed in each cylinder, a liquid filling the space in each cylinder below the piston therein and the space in each of said conduits, and brackets connecting said unit to the respective ones of said pistons.

6. In combination with a power plant unit and a supporting frame therefor, hydraulic supporting means extending between said frame and the respective sides of said unit for supporting said unit, each of said hydraulic means comprising a cylinder element and a piston element therewithin, one of said elements being connected to a side of said unit and the other being mounted on said frame, a conduit connecting together cylinders located on opposite sides of said unit, and a liquid filling said conduit and the spaces between the heads of said cylinders and the pistons associated therewith, whereby said unit is permitted to oscillate bodily about an axis passing through the center of gravity of said unit.

7. In combination with a power plant unit and a supporting frame, a substantially vertically disposed cylinder adjacent each corner of said engine and mounted on said frame, a conduit providing communication between the lower end of each cylinder and the lower end of the cylinder directly opposite and at the other side of said unit, a piston disposed in each cylinder, a liquid filling the space in each cylinder below the piston therein and the space in each of said conduits, brackets connecting said unit to the respective ones of said pistons, and valve means in one of said conduits for preventing movement of liquid therethrough and hence locking said unit against oscillation.

8. In combination with a power plant unit and a supporting frame, a substantially vertically disposed cylinder adjacent each corner of said unit and mounted on said frame, a conduit providing communication between the lower end of each cylinder and the lower end of the cylinder directly opposite and at the other side of said unit, a piston disposed in each cylinder, a liquid filling the space in each cylinder below the piston therein and the space in each of said conduits, brackets connecting said unit to the respective ones of said pistons, and quickly actuatable means for locking said unit against oscillation.

9. In combination with a power plant unit and a supporting frame therefor, means for supporting said unit from said frame, said means including at least one pair of supporting mechanisms located adjacent and connected to opposite sides of said unit, each supporting mechanism including a slidable reciprocating element and equalizing means connecting the respective mechanisms of each pair whereby said unit may oscillate bodily and said oscillation will be limited to oscillation about an axis disposed in general longitudinally of said unit.

10. In combination with a power plant unit and a supporting frame therefor, means for supporting said unit from said frame, said means including at least one pair of supporting mechanisms located adjacent and connected to opposite sides of said unit, each supporting mechanism comprising a portion anchored to said frame and a reciprocable element slidably connected with said portion and connected with a side of said unit, and equalizing means connecting the respective reciprocable elements of each pair of said mechanisms whereby said unit may oscillate bodily and said oscillation will be limited to oscillation about an axis disposed in general longitudinally of said unit.

11. In combination with a power plant unit and a supporting frame therefor, hydraulic means for supporting said unit from said frame, said means being so constructed and arranged as to provide for bodily oscillation of said unit and to limit said oscillation to rotary oscillation about an axis disposed in general longitudinally with respect to the said unit.

12. In combination with a power plant unit, hydraulic means for supporting said unit and having connections therewith at opposite sides, said means being so constructed and arranged as to provide for bodily oscillation of said unit and to limit said oscillation to rotary oscillation about an axis disposed in general longitudinally with respect to said unit.

HERBERT J. NATHAN.